United States Patent [19]
Crowther et al.

[11] Patent Number: 6,034,192
[45] Date of Patent: Mar. 7, 2000

[54] GERMANIUM BRIDGED METALLOCENES PRODUCING POLYMERS WITH INCREASED MELT STRENGTH

[75] Inventors: Donna J. Crowther, Baytown; Natalie A. Merrill; Ching-Tai Lue, both of Houston, all of Tex.

[73] Assignee: Univation Technologies, LLC, Houston, Tex.

[21] Appl. No.: 09/222,973

[22] Filed: Dec. 30, 1998

[51] Int. Cl.[7] .............................. C08F 4/642; C07F 17/00
[52] U.S. Cl. .................... 526/166; 526/160; 526/352; 526/943; 502/103; 502/117; 502/152; 556/28; 556/53; 556/43; 556/46; 556/58; 556/136; 556/138; 987/2
[58] Field of Search ................... 556/28, 53, 43, 556/46, 58, 136, 138; 502/103, 117; 526/127, 129, 160, 166, 943, 352; 987/2

[56] References Cited

U.S. PATENT DOCUMENTS

| | | | |
|---|---|---|---|
| 5,081,322 | 1/1992 | Winter et al. .............................. | 585/9 |
| 5,350,817 | 9/1994 | Winter et al. ............................ | 526/119 |
| 5,532,396 | 7/1996 | Winter et al. ............................. | 556/11 |
| 5,631,335 | 5/1997 | Alt et al. ................................. | 526/126 |
| 5,696,045 | 12/1997 | Winter et al. ............................ | 502/113 |

FOREIGN PATENT DOCUMENTS

| | | |
|---|---|---|
| 0316155 A2 | 5/1989 | European Pat. Off. . |
| 0480390 A2 | 4/1992 | European Pat. Off. . |
| 0516018 A2 | 12/1992 | European Pat. Off. . |
| 0553757 A1 | 8/1993 | European Pat. Off. . |
| 0628565 A1 | 12/1994 | European Pat. Off. . |
| 0645401 A1 | 3/1995 | European Pat. Off. . |
| 0659757 A1 | 6/1995 | European Pat. Off. . |
| 0742225 A1 | 11/1996 | European Pat. Off. . |

OTHER PUBLICATIONS

*J. Organometallic Chem.*, W.A. Herrmann et al., 509, pp. 115–117 (1996).
*J. Orgnometallic Chem.*, K. Patsidis et al., 509, pp. 63–71 (1996).
*New J. Chem.*, vol. 14, No. 6/7, W. Spaleck et al., pp. 499–503, (1990).
*Riken Review*, No. 15, Y. Yamaguchi et al., pp. 17–18, (Aug., 1997).

*Primary Examiner*—Porfirio Nazario-Gonzalez
*Attorney, Agent, or Firm*—Catherine L. Bell; Jaimes Sher; Lisa Kimes Jones

[57] ABSTRACT

This invention relates to a process for polymerizing ethylene comprising contacting ethylene and optional comonomers with a catalyst system comprising an activator and a transition metal compound represented by the formula:

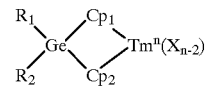

Wherein $R_1$ and $R_2$ are independently hydrogen or a group having up to 100 carbon atoms, $Cp_1$ is a bulky ligand; $Cp_2$ is a bulky ligand or a heteroatom optionally bound to a $C_1$ to $C_{50}$ hydrocarbyl group, n is the valence state of the transition metal, Tm is a Group 3 to 10 metal, and each X is independently an anionic leaving group.

32 Claims, No Drawings

GERMANIUM BRIDGED METALLOCENES PRODUCING POLYMERS WITH INCREASED MELT STRENGTH

FIELD OF THE INVENTION

This invention relates to bridged metallocene catalysts having germanium in the bridging group and their use to polymerize ethylene.

BACKGROUND OF THE INVENTION

Metallocene catalysts are of great interest in the industry because of the great opportunity they provide for tailoring polymer products. Thus there is a need in the art to provide new and varied metallocene catalysts that can produce new and/or tailored polyolefins.

Along this vein, scientists have tried unusual bridging groups looking to find even more interesting catalysts. One such bridging group was diphenyl germanium, which was used as part of diphenyl germanyl flucrenyl cyclopentadienyl zirconium dichloride and methylalumoxane catalyst system, (K. Patsidis et al, Journal of Organometallic Chemistry 509 (1996) 63–71). Patsidis reported that the germanium bridge produced higher molecular weight polypropylene as compared to analogous silica systems.

Hermann et al, (Journal of Organometallic Chemistry 509 (1996) 115–117) disclose the polymerization of ethylene using tin bridged zirconocene in combination with methyl alumoxane. (see also related EP 742 225 A1.) U.S. Pat. No. 5,631,335 also discloses tin bridges.

Riken Review No. 15, August 1997, page 17–18, (The Institute of Physical and Chemical Research) discloses that germanyl bridged zirconocene and hafnocene-MAO catalysts produced higher molecular weight and isotactic polyhexene.

EP 0 316 155 discloses polymerization of propylene using methylalumoxane and dimethylgermylbis(methylcyclopentadienyl)zirconium dichloride.

U.S. Pat. No. 5,532,396 discloses the production of a propylene-ethylene copolymer using rac-diethylgermyl(2-methyl-4-phenyl-1-indenyl)(2-ethyl-1-indenyl)zirconium dichloride combined with methylalumoxane. However, Table I appears to disclose ethylene polymerization using rac-diethylgermyl(2-methyl-4-phenyl-1-indenyl)(2-methyl-1-indenyl)zirconium dichloride or rac-diethylgermyl(2-methyl-4-[1-napthyl]-1-indenyl)(indenyl)zirconium dichloride both with MAO. Since the catalyst activity is reported as PP/g metallocene x hr and example 1 (which Examples 25–28 repeated) used propylene, it is assumed that monomer polymerized was propylene, not ethylene.

U.S. Pat. No. 5,081,322 discloses the production of a polypropylene wax (having about 2.9 weight % ethylene comonomer) using dimethylgermylbisindenylzirconium dichloride combined with methylalumioxane.

Rac(dimethylgermylbisindenylzirconiumdichloride combined with MAO is disclosed as a polymerization catalyst for propylene in W. Spaleck, et al, New Journal of Chemistry, volume 14, number 6/7 June/July/1990, page 499–503.

U.S. Pat. No. 5,696,045 discloses a mixture of dimethylsilylbis(2-methyl-4,6-diisopropyl-1-indenyl) zirconium dichloride and dimethylgermanylbisindenylzirconiumdichloride combined with MAO as a propylene polymerization and copolymerization catalyst. (ethylene is disclosed as comonomer.)

EP 553 757 discloses polymerization of propylene using rac(dimethylgermanylbisindenylzirconiumdichloride in combination with methylalumoxane.

U.S. Pat. No. 5,350,817 discloses the polymerization of propylene with mixtures of zirconocenes including rac dimethylgermylbisindenyl zirconiumdichloride combined with MAO.

EP 480 390 also discloses the production of polypropylene using dimethylgermanylbisindenylzirconiumdichloride combined with MAO.

SUMMARY OF THE INVENTION

This invention relates to a catalyst system comprising a germanium bridged cyclopentadienyl transition metal compound wherein:

a) the germanium may be substituted, preferably by two substituents, except that the germanium may not be substituted by two phenyl groups;

b) the cyclopentadienyl group is bound to the transition metal and the germanium, and the cyclopentadienyl group is a substituted or unsubstituted cyclopentadienyl, indenyl or flucrenyl group;

c) the germanium and the transition metal are bound to another group which may be a heteroatom containing group or a cyclopentadienyl group where the cyclopentadienyl group is a substituted or unsubstituted cyclopentadienyl, indenyl or flourenyl group; and d) the transition metal is also bound to at least 1, preferably 2 anionic leaving groups.

This invention further relates to process for polymerizing ethylene comprising contacting ethylene and optionally up to 50 mole % of one or more comonomers with a catalyst system comprising an activator and a transition metal compound represented by the formula:

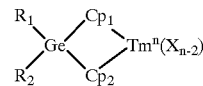

wherein $R_1$ and $R2$ are independently hydrogen, a halogen or a group having up to 100 carbon atoms, provided that $R_1$ and $R_2$ may not both be phenyl, $Cp_1$ is a bulky ligand; $Cp_2$ is a bulky ligand or a heteroatom optionally bound to a $C_1$ to $C_{50}$ hydrocarbyl group, n is the valence state of the transition metal, Tm is a Group 3 to 10 metal, and each X is independently an anionic leaving group.

The activator may be an aluminum alkyl, alumoxane, modified alumoxane or any other oxy-containing organometallic compound or non-coordinating activators, or a combination thereof.

DETAILED DESCRIPTION OF THE INVENTION

This invention further relates to a catalyst system and a process for polymerizing ethylene using the catalysts system, wherein the catalyst system comprises an activator and a compound represented by the formula:

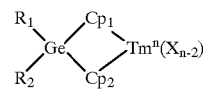

wherein:

$R_1$ and $R_2$ are independently hydrogen, a halogen or linear, branched alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents include methyl, ethyl, propyl, butyl, pentyl, hexyl, cyclopentyl, cyclohexyl, benzyl or phenyl groups and the like, including all their isomers, for example tertiary butyl, iso propyl etc. Non-hydrogen substituents include the atoms carbon, silicon, nitrogen, oxygen, tin, and the like including olefins. $R_1$ and $R_2$ may not both be phenyl.

$Cp_1$ and $Cp_2$ are preferably bulky ligands, preferably a cyclopentadienyl derived ligand or heteroatom substituted cyclopentadienyl derived ligand or hydrocarbyl substituted cyclopentadienyl derived ligand or moiety such as an indenyl ligand, a benzindenyl ligand or a fluorenyl ligand, an octahydrofluorenyl ligand, a cyclooctatetraendiyl ligand, an azenyl ligand and the like, including hydrogenated versions thereof or any other ligand structure capable of η-5 bonding to the transition metal atom. One or more of these bulky ligands is π-bonded to the transition metal atom. Each of $Cp_1$ and $Cp_2$ can be substituted with a combination, which can be the same or different. Non-limiting examples of substituents include hydrogen or linear, branched alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents include methyl, ethyl, propyl, butyl, pentyl, hexyl, cyclopentyl, cyclohexyl, benzyl or phenyl groups and the like, including all their isomers, for example tertiary butyl, isopropyl etc. Non-hydrogen substituents include the atoms carbon, silicon, nitrogen, oxygen, tin, germanium and the like including olefins. In a preferred embodiment $Cp_1$ and $Cp_2$ are susbitituted at least one same or different position. In a preferred embodiment $Cp_1$ is independently substituted at 4 positions with a C1 to C6 alkyl, preferably all 4 positions are substituted with methyl and $Cp_2$ is substituted with hydrogen only. $Cp_1$ and $Cp_2$ may also be other types of bulky ligands including but not limited to phospholes, bulky amides, phosphides, alkoxides, or aryloxides;

n is the valence state of the transition metal, preferably 4, 5 or 6.

Tm is preferably a group 3 to 10 transition metal, preferably a group 4, 5 or 6 transition metal or a metal from the lanthanide or actinide series, more preferably a group 4 metal, more preferably titanium, zirconium or hafnium.

Each X is independently a hydrogen, hydrocarbyl, hydride, halide, carboxylate or combination thereof, in a preferred embodiment each X may independently be selected form the group consisting of weak bases such as amines, phosphines, ethers, carboxylates, dienes, amides, phosphides, alkoxides, hydrocarbyl radicals having from 1 to 20 carbon atoms or halogens and the like.

In addition to the transition metal, each X may be optionally bonded to $Cp_1$ or $Cp_2$. Any two X ligands may be bridged to each other. In an alternate embodiment, $Cp_2$ is a heteroatom containing nitrogen or phosphorus which in turn is preferably bound to a $C_1$ to $C_{50}$ hydrocarbyl group.

In a preferred embodiment $R_1$ and $R_2$ are independently a methyl group, an ethyl group, a propyl group, a butyl group, a pentyl group, a hexyl group, a heptyl group, an octyl group, or $R_1$ and $R_2$ fuse to form a $C_4$ to $C_{31}$ ring.

The activator may be an aluminum alkyl, alumoxane, modified alumoxane or any other oxy-containing organometallic compound or non-coordinating activators, or a combination thereof The non-coordinating anion is typically a chemically stable, non-nucleophillic anionic complex, preferably having a molecular diameter of 4 Å or greater.

The catalysts are preferably combined with an activator to form an olefin polymerization catalyst system. Preferred activators include alkyl aluminum compounds, alumoxanes, modified alumoxanes, non-coordinating anions and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference. Other activators include those described in PCT publication WO 98/07515 such as tris (2, 2',2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

The transition metal compounds are made according to standard techniques well known in the art.

The activator and catalyst are typically combined in ratios of 1:1 to 10,000:1, preferably 50:1 to 1001:1, even more preferably 100:1 to 500:1. For example preferred ratios of Al to Zr are 1:1 to 10,000:1, preferably 50:1 to 1001:1, even more preferably 100:1 to 500:1.

Polymerization Process

The catalysts and catalyst systems described above are suitable for use in any polymerization process including a solution, gas, high pressure or slurry process or a combination thereof, most preferably a gas or slurry phase process.

The catalysts and catalyst systems described above can be used for solution, slurry or gas phase polymerization or copolymerization reactions involving the polymerization of ethylene and one or more of the monomers having from 2 to 30 carbon atoms, preferably 2–12 carbon atoms, and more preferably 2 to 8 carbon atoms. In particular, these catalyst systems are capable of copolymerization reactions involving the polymerization of ethylene and one or more olefin monomers of propylene, butene-1, pentene-1, 4-methyl-pentene-1, hexene-1, octene-1, decene-1, and cyclic olefins or a combination thereof. Other comonomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms.

Preferably the comonomer(s) may be present at up to 50 mole %, and is typically present at from about 0.1 mole % to 50 mole %. Depending upon the application, the copolymer may have about 0.5 to about 10 mole % or may have about 1 to about 30 mole %. In other embodiments the comonomers may be present at about 1.5 mole % to about 15 mole %.

In another embodiment ethylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, ethylene/propylene/norbornene and the like.

In another preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, 2-ethyl-hexene, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C). Two preferred polymerization methods for the slurry process are those employing a loop reactor and those utilizing a plurality of stirred reactors in series, parallel, or combinations thereof Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig ( 3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, triisobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or more of the catalysts are combined with up to 6 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. These agents may be dry tumbled with the catalyst or may be fed into the reactor in a solution with or without the catalyst system or its components.

In another preferred embodiment the catalysts combined with the activators are tumbled with 1 weight % of aluminum distearate or 2 weight % of an antistat, such as a methoxylated amine, such as Witco's Kemamine AS-990 from ICI Specialties in Bloomington Del.

More information on using aluminum stearate type additives may be found in U.S. Ser. No. 09/113,261 filed Jul. 10, 1998, which is incorporated by reference herein.

The polymers produced using the catalyst systems described above have the unusual attribute of high melt strength and thus are desirable for use in applications where high melt strength is required, such as film, blow molding or injection molding applications.

In a preferred embodiment melt strengths (as measured by the method described in the testing procedures) of 6 cN or more, preferably 10 cN or more, more preferably 15 cN, preferably 20 cN or more, more preferably 30 cN or more, preferably 40 cN or more are achieved. Melt strength is measured as described below in the experiment section.

In another embodiment the polymers produced have a density of 0.85 g/cc to 0.965 g/cc, preferably 0.90 to 09.5 g/cc, preferably 0.90 to 0.94 g/cc, preferably 0.90 to 0.93 g/cc as measured by ASTM D 1505.

In another embodiment the polymers produced have Melt index ratio (MIR) of 40 or more, preferably 50 or more, preferably 60 or more more preferably 70 or more, preferably 80 or more, preferably 100 or more as measured by ASTM D 1238.

In another embodiment the polymers produced have an Mw/Mn of 2 to 40, preferably 2 to 30, preferably 2 to 25 as measured by the GPC procedure in the examples section below.

In another embodiment the polymers produced have molecular weight of 10,000 to 1,000,000, preferably 30,000 to 500,000, preferably 40,000 to 250,000, more preferably 50,000 to 200,000.

The polymers produced herein can be used for the production of blown or cast films. Additives such as block, antiblock, antioxidants, pigments, fillers, processing aids, UV stabilizers, neutralizers, lubricants, surfactants and/or nucleating agents may also be present in one or more than one layer in the films. Useful additives include silicon dioxide, titanium dioxide, polydimethylsiloxane, talc, dyes, wax, calcium stearate, carbon black, low molecular weight resins and glass beads. The films herein can also be combined with other layers such as metal layers, cloth or non-woven layers, wood, paper, glass, other plastics such as polypropylene, pethylene terethalate, polyethylene, and the like.

In another embodiment one or both of surface layers may be modified by corona treatment, electron beam irradiation, gamma irradiation, or microwave. In a preferred embodiment one or both of the surface layers is modified by corona treatment.

The polymers produced herein may also be used in blow molding and thermoforming applications.

EXAMPLES

All catalyst systems were supported on Davison 948 silica gel which had been thermally treated at 600° C. The methylalumoxane was obtained from Albermarle in Baton Rogue, La., as a 30% solution in toluene. Anhydrous toluene from Aldrich was used without any further purification.
Testing Procedures:

Melt Strength (MS) was measured at 190° C. with a Goettfert Rheotens melt strength apparatus in conjunction with an Instron capillary Rheometer. A polymer melt strand was extruded from a capillary die and gripped between two counter rotating wheels on the apparatus whose speed was increased at a constant acceleration and controlled by the Acceleration Programmer (Model 45917, at a setting of 12). The maximum pulling force (in units of cN) achieved before the strand broke or started to show draw resonance was determined as the melt strength. The capillary die had a length of one inch (2.54 cm) and a diameter of 0.06 inches (0.15 cm). The polymer melt was extruded from the die at a speed of 3 inches/min (7.62 cm/min). The distance between the die exit and the wheel contact point should be 3.94 inches (100 mm).

Melt Index (MI) was measured by the procedure according to ASTM 1238, condition E.

Melt Index Ratio (MIR) is the ratio of 121 over 12 as measured by the procedure according to ASTM D 1238.

Mn and Mw were measured by gel permeation chromatography on a waters 150 C GPC instrument equipped with differential refraction index detectors. The GPC columns were calibrated by running a series of narrow polystyrene standards and the molecular weights were calculated using Mark Houwink coefficients for the polymer in question.

Density was measured according to ASTM D 1505.
% comonomer was measured by $^1$H NMR.

Preparation of Catalysts

Catalyst 1 diethylgermanium cyclopentadienyl tetramethylcyclopentadienyl zirconium dichloride.

0.79 grams of diethylgermanium cyclopentadienyl tetramethylcyclopentadienyl zirconium dichloride was slurried in 35.5 g of toluene and was then reacted with 35.5 g 30% MAO solution. An additional 27.0 g 30% MAO solution was then added and the reaction mixture was then stirred for 2 hours. Silica gel (40.0 g) was added to the reaction mixture in increments and was mixed with a spatula. The catalyst was dried at ambient temperature in vacuo for 18 hours.

Catalyst 2 dimethylgermanium bisindenyl zirconium dichloride.

0.38 grams of dimethylgermanium bisindenyl zirconium dichloride was slurried in 25.3 g of toluene and was then reacted with 14.8 g 30% MAO solution and the reaction mixture was then stirred for 15 minutes. Silica gel (18.5 g), dried at 600° C. was added to the reaction mixture and was mixed with a spatula. The catalyst was dried at ambient temperature in vacuo for 40 hours.

Catalyst 3 dimethylgermanium bis(tetramethylcyclopentadienyl) zirconium dichloride 0.52 grams of dimethylgermanium bis(tetramethylcyclopentadienyl) zirconium dichloride was slurried in 34.5 g of toluene and was then reacted with 34.5 g 30% MAO solution. Silica gel (25 g) was added to the reaction mixture in increments and was mixed with a spatula. The catalyst was dried at ambient temperature in vacuo for 18 hours.

Catalyst 4 diethylgermanium tetramethylcyclopentadienyl fluorenyl zirconium dichloride.

0.59 grams of diethylgermanium tetramethylcyclopentadienyl fluorenyl zirconium dichloride was slurried in 34.5 g of toluene and was then reacted with 34.5 g 30% MAO solution. Silica gel (25 g) was added to the purple reaction mixture and was mixed well with a spatula. The catalyst was dried at ambient temperature in vacuo for about 18 hours.

Comparative Catalyst 1 dimethylsilyl cyclopentadienyl tetramethylcyclopentadienyl zirconium dichloride.

The catalyst system was prepared as described above using 1.18 g of dimethylsilyl cyclopentadienyl tetramethylcyclopentadienyl zirconium dichloride, 54 g toluene, 53.5 g 30% MAO and 40.0 g silica.

Comparative Catalyst 2 dimethylsilyl bisindenyl zirconium dichloride.

The catalyst system was prepared as described above using 0.45 g of dimethylsilyl bisindenyl zirconium dichloride, 41.6 g toluene, 38.7 g 30% MAO and 30 g silica.

Comparative Catalyst 4 dimethylsilyl bis(tetramethylcyclopentadienyl)zirconium dichloride.

The catalyst system was prepared as described above using 0.74 g of dimethylsilyl bis(tetramethylcyclopentadienyl) zirconium dichloride, 53.5 g toluene, 53.5 g 30% MAO and 40.0 g silica.

Comparative Catalyst 5 dimethylsilyl tetramethylcyclopentadienyl fluorenyl zirconium dichloride.

The catalyst system was prepared as described above using 0.67 g of dimethylsilyl tetramethylcyclopentadienyl fluorenyl zirconium dichloride, 53.5 g toluene, 53.5 g 30% MAO and 40.0 g silica.

Examples 1–9 were run according to the following general procedure:

All the catalysts were screened in a fluidized bed reactor equipped with devices for temperature control, catalyst feeding or injection equipment, gas chromatograph analyzer for monitoring and controlling monomer and gas feeds and equipment for polymer sampling and collecting. The reactor consists of a 6 inch (15.24 cm) diameter bed section increasing to 10 inches (25.4 cm) at the reactor top. Gas comes in through a perforated distributor plate allowing fluidization of the bed contents and polymer sample is discharged at the reactor top. The data are reported in tables 1, 2 and 3.

TABLE 1

| Example | 1 | 2 | 3 | 4 |
|---|---|---|---|---|
| Catalyst | 1 | 2 | 3 | 4 |
| Temperature ° F. (° C.) | 175 (79) | 175 (79) | 175 (79) | 175 (79) |
| Pressure psi (mPa) | 300 (2.1) | 300 (2.1) | 300 (2.1) | 300 (2.1) |
| Ethylene (mole %) | 35 | 359 | 35 | 35.1 |
| Hydrogen (ppm) | 540 | 450 | 88 | 908 |
| H2 Flow Sccm | 0 | 15.5 | 0 | 145.5 |
| Hexene (mole %) in feed | 0.37 | 0.36 | 1 | 0.29 |
| Residence Time (hrs) | 5.4 | 7.5 | 7.0 | 4.0 |
| Catalyst Productivity (g/g) | 1729 | 460 | 373 | 593 |
| Material Balance | | | | |

TABLE 2

| Example | 5 | 6 | 7 | 8 | 9 |
|---|---|---|---|---|---|
| Catalyst | C1 | C2 | C5 | C4 | C5 |
| Temperature ° F. (° C.) | 175 (79) | 175 (79) | 162 (72) | 175 (79) | 175 (79) |
| Pressure (psi) | 300 (2.1) | 300 (2.1) | 300 (2.1) | 300 (2.1) | 300 (2.1) |
| Hydrogen Flow (sccm) | 0 | 17.1 | | 0.36 | 103.1 |
| Ethylene (mole %) | 35 | 30.0 | 34.9 | 35 | 35 |
| Hydrogen (ppm) | 659 | 474 | 448 | 106 | 1179 |
| Hexene (mole %) in feed | 0.47 | 0.20 | 0.28 | 0.87 | 0.41 |
| Residence Time (hrs) | 8.2 | 5.1 | 4.0 | 4.8 | 4.6 |
| Catalyst Productivity (g/g) | 271 | 1092 | 1307 | 3458 | 107 |
| Material balance | | | | | |

TABLE 3

| Example | 1 | 2 | 3 | 4 | 5 | 6 | 7 | 8 | 9 |
|---|---|---|---|---|---|---|---|---|---|
| Catalyst | 1 | 2 | 3 | 4 | C1 | C2 | C5 | C4 | C5 |
| Density (g/cc) | 0.9185 | 0.9219 | 0.9186 | 0.9216 | 0.9185 | 0.9212 | 0.9294 | 0.9193 | 0.9208 |
| MI (dg/min) | 3.16 | 0.56 | 0.85 | 1.1 | 2.42 | 0.25 | 0.28 | 1.72 | 0.81 |
| MIR | 46 | 55.6 | 36.5 | 68.4 | 51.1 | 115.8 | 70.75 | 31.7 | 69.1 |
| Melt Str. (cN) | 7.2 | 31 | 10.4 | 6.8 | 4.2 | 10.2 | 11.7 | 7.4 | 8.7 |
| $M_n$ | 14600 | 6300 | | | 19600 | | 8400 | 18900 | |

TABLE 3-continued

| Example | 1 | 2 | 3 | 4 | 5 | 6 | 7 | 8 | 9 |
|---|---|---|---|---|---|---|---|---|---|
| Wt % hexene in the feed | 10.8 | | | | | | 5.6 | | |
| $M_w$ (×1000) | 108 | 96.7 | | | 98 | | 176.4 | 108.9 | |

MI = melt index,
MIR = melt index ratio,

It can be noted from the above data that the germanium bridged compounds tend to produce ethylene copolymers having higher melt strength than their silyl bridged counterparts.

Example 10

Ethylene polymers were then produced using catalyst two according to the following procedure: The polymerization runs were performed in a 2-liter autoclave reactor equipped with an anchor impeller, an external water jacket for temperature control. A regulated supply of dry nitrogen, ethylene or ethylene/butene mixture, and reactor ports for introduction of seed bed, scavenger other components hydrogen and supported catalyst. The reactor was dried and degassed at 140° C. under nitrogen for a minimum of one hour prior to use. 200 g dried sodium chloride and 0.2 ml triethyl aluminum (TEAL 25 mole % in heptane) was introduced into the reactor and heated to 100° C. The reactor was then vented and 0.8 psi (5.5 kPa) of nitrogen purged through. After 5 minutes, nitrogen and the reactor outlet were sealed off and catalyst 2 was pressured into the reactor under nitrogen. Then ethylene (or ethylene/butene mixture) was pressured into the reactor and the flow of monomer(s) left open to maintain constant pressure throughout the run. The polymerization reaction was limited to 60 minutes at 85° C. The reaction was quenched by venting and rapid cooling of the system. The catalyst was killed by air exposure and the reactor contents were poured into distilled water to dissolve the seed bed. Polyethylene was recovered by filtration and rinsed by passing toluene, hexane and methanol at ambient temperature through a Buchner funnel containing the polymer.

The reaction conditions and data are reported in Table 4.

and scope of the invention. Accordingly it is not intended that the invention be limited thereby.

We claim:

1. A process for polymerizing ethylene comprising contacting ethylene and optionally up to 50 mole % of one or more comonomers (based upon the ethylene and the comonomers) with a catalyst system comprising an activator and a transition metal compound represented by the formula:

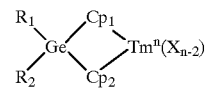

wherein $R_1$ and $R_2$ are independently hydrogen or a group having up to 100 carbon atoms, provided that $R_1$ and $R_2$ may not both be phenyl, $Cp_1$ is a bulky ligand; $Cp_2$ is a bulky ligand or a heteroatom, optionally bound to a $C_1$ to $C_{50}$ hydrocarbyl group, n is the valence state of the transition metal, Tm is a Group 3 to 10 metal, and each X is independently an anionic leaving group.

2. The process of claim 1 wherein Tm is a Group 4 metal.

3. The process of claim 1 wherein Tm is zirconium, hafnium or titanium.

4. The process of claim 1 wherein Tm is zirconium.

5. The process of claim 1 wherein $R_1$ and $R_2$ are independently hydrogen, or linear, or branched alkyl radicals or cyclic alkyl, alkenyl, alkynl or aryl radicals or combination thereof having from 1 to 30 carbon atoms.

6. The process of claim 1 wherein $R_1$ and $R_2$ are independently a hydrogen, methyl, ethyl, propyl, butyl, pentyl, hexyl, cyclopentyl, cyclohexyl, benzyl or phenyl group.

7. The process of claim 1 wherein $R_1$ and $R_2$ are combined to form a ring structure.

| Run | A | B | C | D | E | F |
|---|---|---|---|---|---|---|
| Monomer(s) | Ethylene | Ethylene/Butene* | Ethylene/Butene* | Ethylene | Ethylene | Ethylene/Butene* |
| Partial pressure of monomer(s) | 100 psi (690 kPa) | 100 psi (690 kPa) | 100 psi (690 kPa) | 120 psi (827 kPa) | 100 psi (690 kPa) | 100 psi (690 kPa) |
| Catalyst amt | 200 mg | 200 mg | 500 mg | 500 mg | 200 mg | 200 mg |
| Yield | 10.9 g | 9.8 g | 19.1 g | 48.8 g | 5.6 g | 6.1 g |
| Mn | | | | 34000 | | |
| Mw | | | | 16900 | | |
| Mw/Mn | | | | 4.95 | | |
| Melt Str. | | | 21.3 cN | | | |
| comonomer | | | 4.6 mol % | | | |

*5 mole % butene and 95 mole % ethylene

All documents described herein are incorporated by reference herein, including any priority documents and/or testing procedures. As is apparent form the foregoing general description and the specific embodiments, while forms of the invention have been illustrated and described, various modifications can be made without departing from the spirit 8. The process of claim 1 wherein $Cp_1$ and $Cp_2$ are independently a cyclopentadienyl derived ligand or heteroatom substituted cyclopentadienyl derived ligand or hydrocarbyl substituted cyclopentadienyl derived ligand or an indenyl ligand, a benzindenyl ligand, a fluorenyl ligand, an octahydrofluorenyl ligand, a cyclooctatetraendiyl ligand, an azenyl ligand or a hydrogenated versions thereof.

9. The process of claim 1 wherein $Cp_1$ and/or $Cp_2$ are a ligand structure capable of η-5 bonding to Tm.

10. The process of claim 1 wherein $Cp_1$ and/or $Cp_2$ are a substituted cyclopentadienyl, substituted indenyl, or substituted fluorenyl, wherein the substituents are linear, branched alkyl radicals or cyclic alkyl, alkenyl, alkynl or aryl radicals or combination thereof comprising from 1 to 30 carbon atoms.

11. The process of claim 10 wherein the substituents are selected from the group consisting of methyl, ethyl, propyl, butyl, pentyl, hexyl, cyclopentyl, cyclohexyl, benzyl or phenyl groups.

12. The process of claim 10 wherein the substituents comprise, silicon, nitrogen, oxygen, tin, germanium.

13. The process of claim 1 wherein each X is independently a hydrogen, hydrocarbyl, hydride, halide, carboxylate or combination thereof.

14. The process of claim 1 wherein each X is independently selected form the group consisting of amines, phosphines, ethers, carboxylates, dienes, amides, phosphides, and alkoxides.

15. The process of claim 1 wherein each X is independently selected form the group consisting of hydrocarbyl radicals having from 1 to 20 carbon atoms, chlorine, bromine, iodine, or fluorine.

16. The process of claim 1 wherein the activator is an alumoxane or a modified alumoxane.

17. The process of claim 1 wherein the activator is an ionizing compound.

18. The process of claim 1 wherein the activator is a non-coordinating anion.

19. The process of claim 1 wherein the comonomer is present at about 0.1 mole % to 50 mole %.

20. The process of claim 1 wherein the comonomer is present at about 0.5 mole % to about 10 mole %.

21. The process of claim 1 wherein the comonomer is present at about 1 mole % to about 30 mole %.

22. The process of claim 1 wherein the comonomer is present at about 1.5 mole % to about 15 mole %.

23. The process of claim 1 wherein the comonomer(s) is selected from the group consisting of propylene, butene-1, pentene-1, 4-methyl-pentene-1, hexene-1, octene-1, decene-1, 3-methyl-pentene-1, 2-ethyl-hexene, norbornene and norbornadiene.

24. The process of claim 1 wherein the comonomer(s) is selected from the group consisting of alpha-olefins having from 4 to 15 carbon atoms.

25. The process of claim 1 wherein the polymerization is conducted in a gas phase reactor.

26. The process of claim 1 wherein the polymerization is conducted in a slurry phase reactor.

27. A catalyst system for polymerizing ethylene and at least one comonomer comprising a germanium bridged cyclopentadienyl transition metal compound wherein:
   a) the germanium may be substituted, except that the germanium may not be substituted with two phenyl groups or with two methyl groups;
   b) the cyclopentadienyl group is bound to the transition metal and the germanium and the cyclopentadienyl group is a substituted or unsubstituted cyclopentadienyl, indenyl or fluorenyl group;
   c) the germanium and the transition metal are bound to another group which may be a heteroatom containing group or a cyclopentadienyl group where the cyclopentadienyl group is a substituted or unsubstituted cyclopentadienyl, indenyl or fluorenyl group; and
   d) the transition is also bound to at least 2 anionic leaving groups.

28. The catalyst system of claim 27 further comprising an activator.

29. The process of claim 27 wherein the activator is an alumoxane or a modified alumoxane.

30. The process of claim 27 wherein the activator is an ionizing compound.

31. The process of claim 27 wherein the activator is a non-coordinating anion.

32. A process for polymerizing ethylene comprising contacting ethylene and optionally up to 50 mole % of one or more comonomers (based upon the ethylene and the comonomers) with a catalyst system comprising an activator and a group 3 to 10 transition metal compound wherein the transition metal compound is a germanium bridged cyclopentadienyl transition metal compound:
   a) the germanium may be substituted, except that the germanium may not be substituted with two phenyl groups;
   b) the cyclopentadienyl group is bound to the transition metal and the germanium, and the cyclopentadienyl group is a substituted or unsubstituted cyclopentadienyl, indenyl or fluorenyl group;
   c) the germanium and the transition metal are bound to another group which may be a heteroatom containing group or a cyclopentadienyl group where the cyclopentadienyl group is a substituted or unsubstituted cyclopentadienyl, indenyl or flourenyl group; and
   d) the transition metal is also bound to at least one leaving groups.

* * * * *